(12) United States Patent
Hosier et al.

(10) Patent No.: US 6,657,662 B1
(45) Date of Patent: Dec. 2, 2003

(54) SYSTEM FOR RESETTING THE VIDEO OFFSET FROM DARK PHOTOSENSORS IN AN IMAGE SENSOR ARRAY

(75) Inventors: Paul A. Hosier, Rochester, NY (US); Scott L. TeWinkle, Ontario, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/389,621

(22) Filed: Sep. 3, 1999

(51) Int. Cl.$^7$ .......................... H04N 9/64; H04N 5/225; H04N 5/335; H04N 3/14
(52) U.S. Cl. .................. 348/245; 348/218.1; 348/296
(58) Field of Search ................ 348/245, 296, 348/243, 257, 258, 259, 260, 261, 218.1

(56) References Cited

U.S. PATENT DOCUMENTS

| | | | | |
|---|---|---|---|---|
| 4,387,402 A | * | 6/1983 | Lewis | 348/251 |
| 4,555,732 A | * | 11/1985 | Tuhro | 348/241 |
| 4,567,527 A | * | 1/1986 | Yokomizo | 348/255 |
| 5,262,871 A | * | 11/1993 | Wilder et al. | 348/307 |
| 5,452,001 A | * | 9/1995 | Hosier et al. | 348/230.1 |
| 5,493,334 A | * | 2/1996 | Zortea et al. | 348/243 |
| 5,512,950 A | * | 4/1996 | Watanabe et al. | 348/296 |
| 5,654,755 A | * | 8/1997 | Hosier | 348/245 |
| 5,900,927 A | * | 5/1999 | Hasegawa | 348/353 |
| 5,940,125 A | * | 8/1999 | Suganuma | 348/243 |
| 6,005,615 A | * | 12/1999 | Tsuda | 348/243 |
| 6,067,113 A | * | 5/2000 | Hurwitz et al. | 348/250 |
| 6,144,408 A | * | 11/2000 | MacLean | 348/243 |
| 6,201,573 B1 | * | 3/2001 | Mizuno | 348/308 |

* cited by examiner

*Primary Examiner*—Wendy R. Garber
*Assistant Examiner*—Jason Whipkey
(74) *Attorney, Agent, or Firm*—R. Hutter (57) ABSTRACT

In a photosensitive device wherein signals are read sequentially from a plurality of photosensors onto a video line, an offset control detects a condition in which the photosensors experience a predetermined number of integration periods without reading out signals onto the video line. In response to such a condition, the offset control resets the offset on the video line.

12 Claims, 6 Drawing Sheets

SYSTEM FOR RESETTING THE VIDEO OFFSET FROM DARK PHOTOSENSORS IN AN IMAGE SENSOR ARRAY

CROSS-REFERENCE TO RELATED APPLICATION

Cross-reference is made to the following co-pending U.S. patent application: 09/139,077, filed Aug. 24, 1998, assigned to the assignee hereof.

INCORPORATION BY REFERENCE

The present application incorporates by reference U.S. Pat. No. 5,654,755, assigned to the assignee hereof.

FIELD OF THE INVENTION

The present invention relates to image sensor arrays used in raster input scanners. In particular, the invention relates to photosensitive chips wherein each photosensor outputs signals onto a common video line.

BACKGROUND OF THE INVENTION

Image sensor arrays typically comprise a linear array of photosensors which raster scan an image bearing document and convert light from the image areas viewed by each photosensor to image signal charges. Following an integration period, the image signal charges are amplified and transferred as an analog video signal to a common output line or bus through successively actuated multiplexing transistors.

For high-performance image sensor arrays, a preferred design includes an array of photosensors of a width comparable to the width of a page being scanned, to permit one-to-one imaging without reductive optics. In order to provide such a "full-width" array, relatively large silicon structures must be used to define the large number of photosensors. A preferred technique to create such a large array is to make the array out of several butted silicon chips. In one proposed design, an array is intended to be made of 20 silicon chips, butted end-to-end, each chip having 248 active photosensors spaced at 400 photosensors per inch.

Photosensitive devices may be one-dimensional or two-dimensional, and can be either of the "active" variety, wherein the photosensors output voltage signals, or in the form of a charge-coupled device, or CCD, which outputs a sequence of charges from a series of individual photosensors. In all of these various types of photosensitive devices, a common design feature is the use of "dark" photosensors, which are used to periodically reset the offset voltage for the photosensors being read out. These dark photosensors are of the same semiconductor structure as the other "active" photosensors on each chip, but the dark photosensors are not exposed to light. In most designs, the dark photosensors are provided with an opaque shield, such as of aluminum or silicon, to prevent the influence of light thereon. In the scanning process, with each readout cycle of active photosensors on each chip, the readout of the first photosensor is proceeded by readouts of one or more dark photosensors, which are used to reset the voltage offset associated with the whole chip, and thereby correct signal drift when the active photosensors are reading out their signals. In other words, the readout of a dark photosensor with each scan can serve as a reference offset or "zero point" so that the absolute values of light intensity on the active photosensors may be determined. The use of a dark photosensor output when reading out signals from active photosensors can significantly compensate for performance variations of multiple chips in a single apparatus, and also for changes in the performance of a photosensitive device over time.

According to certain designs of scanning apparatus, certain sets of photosensors within a larger apparatus are occasionally temporarily inactivated. There may be various reasons for temporarily inactivating certain photosensors within a larger scanner. For example, in a full-color apparatus in which different sets of photosensors are respectively sensitive to different primary colors, sets of photosensors which are sensitive to one particular color may be temporarily inactivated while photosensors for another color are being used; also, in large-scale, engineering-type input scanners, it may be desirable to disable certain portions of a long array of photosensors, such as when it is known that original documents of a relatively small size are to be scanned. In these situations where certain photosensors within a larger apparatus are not used, the inactivated photosensors themselves will still function as photosensors (in the sense of generating charges in response to light impinging thereon) but the resulting voltage signals are not read out of the photosensitive chip. This situation causes a practical problem, in that the electrical activities of the unused photosensors can cause the offset controls associated with the video line to drift or otherwise become unpredictable. It is an object of the present invention to provide a photosensitive apparatus in which the fact that certain photosensors are temporarily disabled does not affect the offset control of the apparatus.

DESCRIPTION OF THE PRIOR ART

U.S. Pat. No. 5,654,755 describes a circuit for correcting the offset of the video output of a set of active photosensors, based on the output of dark photosensors. An averaging RC circuit in parallel with the video line accumulates an average signal based on a large number of readings from the dark photosensors. The average signal is periodically clamped to a correction capacitor in series on the video line, the charged correction capacitor adjusting the offset on the active-photosensor signals which subsequently pass through the video line.

The co-pending U.S. patent application cross-referenced above is directed toward an offset restore system for use in a photosensitive device of a design similar to that shown in the '755 patent. The co-pending application is concerned with placing an initial charge on a correction capacitor which is used to establish an off-set on the video line. The correction capacitor is "jump started" with an initial predetermined charge so that, at power up, the apparatus does not have to develop a charge on the correction capacitor. Without such a jump-start, the initial charge on the correction capacitor would be zero, and this zero charge would in fact have a distorting effect on the offset control.

SUMMARY OF THE INVENTION

According to the present invention, there is provided a photosensitive device and a method of using thereof. The device comprises a set of photosensors and a video line, the photosensors having an integration period in response to an integration signal and reading out video signals onto the video line in response to a readout signal. An offset on the video line is reset when the device receives a predetermined number of integration signals without receiving a readout signal.

DETAILED DESCRIPTION OF THE INVENTION

Figure 1:
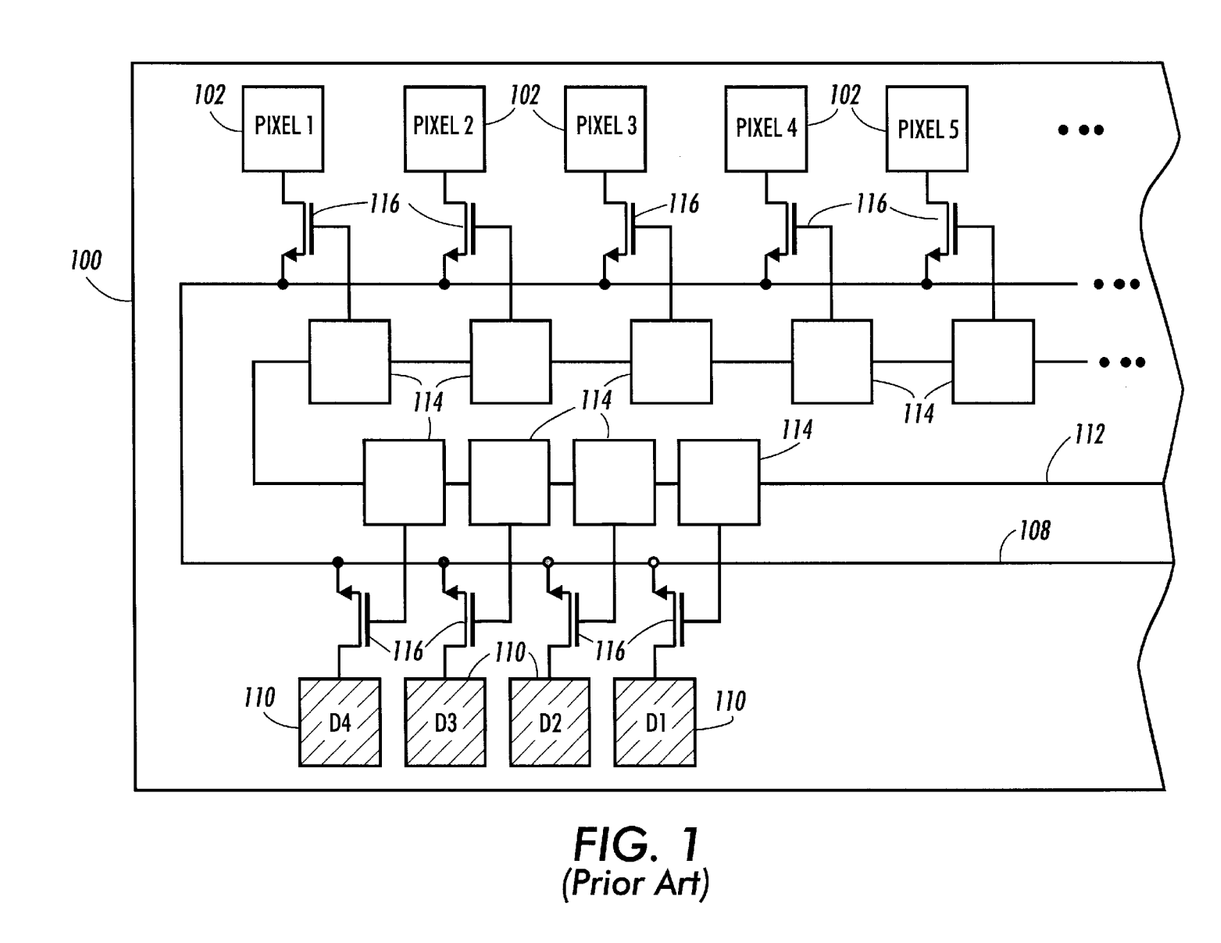
FIG. 1 is a plan view of the relevant portions of an active photosensitive device having dark photosensors and active photosensors reading to a common video line.

FIG. 1 is a simplified plan view showing a configuration of photosensors on a single photosensor chip 100. Such a chip would be found, for example, in a raster input scanner having a linear array of photosensors, as would be used, for example, in a digital copier or scanner. As is well known, an original hard-copy image is moved relative to the chip, so that each individual photosensor on the chip is exposed to a sequence of small areas on the original image. A typical raster input scanner may include a single chip which, in combination with reduction optics, is exposed to an entire width of a page being scanned; or alternately could include a plurality of such chips, butted end-to-end, which together form a single page-width linear array of photosensors.

In the plan view of FIG. 1, there is shown a long array of active (i.e., photosensitive) photosensors 102 which share a common video line 108 with a plurality of "dark photosensor" photosensors 110, which are individually indicated as D1–D4. Also associated with the photosensors 102 and 110 is a shift register line 112 which connects a series of shift register select switches 114. The shift register select switches 114 have associated therewith a series of transistor switches 116. When each transistor switch 116 is activated, the transistor switch permits the charge from its associated individual photosensor 102 or 110 to be readout through the switch 116 onto the common video line 108. There is thus run through the line of shift register switches 114 on line 112 digital information in the form of a string of 0's with a single "1" therein. As the string of digits moves through the shift register switches 114 along line 112, the single "1" activates the photosensors in a sequence as it moves down the input line 112, thereby causing the photosensors 108 and 102 to output the signals thereon, in order, onto video line 108.

In the particular design of FIG. 1, the first photosensors to be activated with each scan are the dark photosensors 110, followed by the active photosensors 102. As mentioned above, the dark photosensors 110 are typically of the same general structure as the active photosensors 102, except that they are not exposed to light in any way. Typically, the dark photosensors 110 are shielded from light, such as with a layer of aluminum. Because both the dark photosensor photosensors 110 and active photosensors 102 are created in the same chip, they will be as physically similar as possible, so that any systemic process variation of the active photosensors 102 will be equally apparent in the dark photosensors 110. In this way, with each scan of video signals the dark photosensors in effect recalibrate the chip by establishing a video signal consistent with no light impinging on a photosensor. Once this offset is determined, systemic errors in the outputs of the active photosensors can be compensated for.

Figure 2:
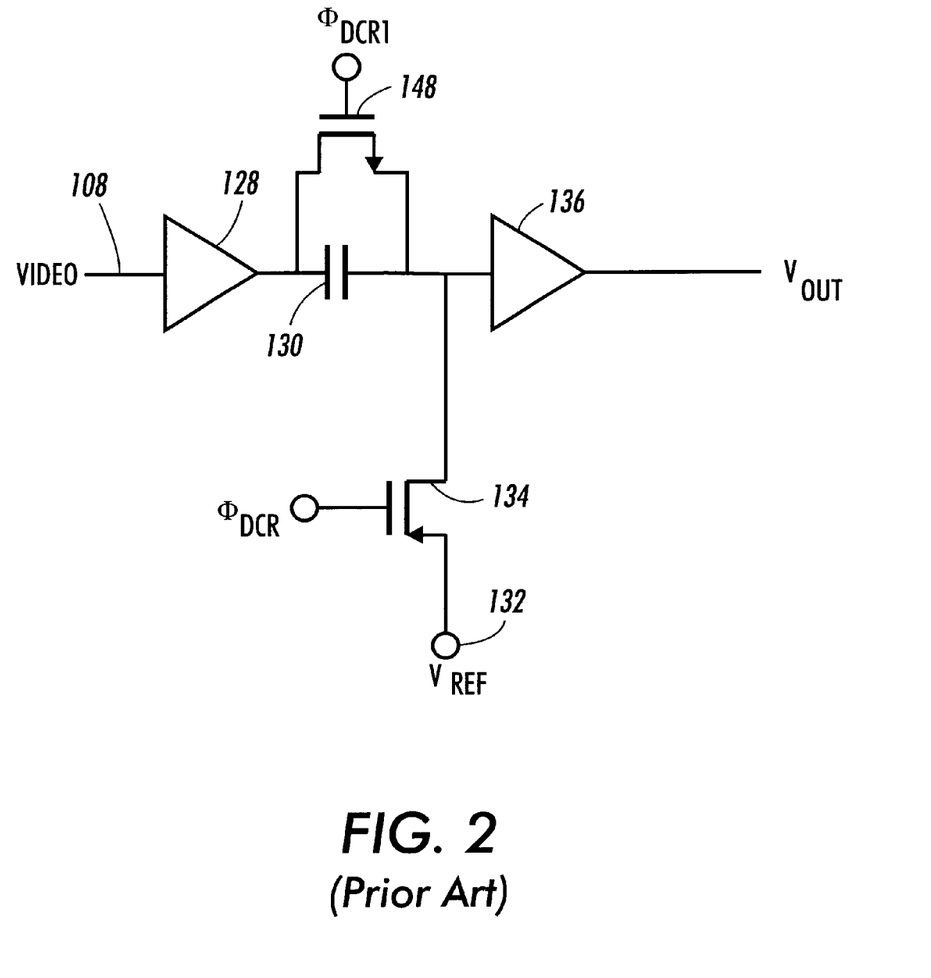
FIG. 2 is a schematic of a simple circuit for causing dark photosensor signals to determine an offset for subsequent active photosensor video signals.

A simple apparatus for carrying out the operation of causing the dark photosensors to determine the offset for the active photosensor which are subsequently read out on video line 108 is shown in FIG. 2. The "offset correction device" circuit shown in FIG. 2 is intended to be immediately downstream of the active photosensors on video line 108. Following passage through a unity-gain amplifier 128, there is provided on video line 108 a capacitor 130, which will specifically be referred to as "correction capacitor" 130. Correction capacitor 130 retains a charge thereon which influences the magnitude of voltage signals from active photosensors which are read out through video line 108. Because of the relatively high speeds of reading out active photosensors with each scan, the charge on correction capacitor 130 will remain reasonably constant through every readout sequence. In order to place an original charge on correction capacitor 130, that is, a charge on correction capacitor 130 which will influence the magnitude of voltage signals in a desirable manner, the correction charge on correction capacitor 130 is fixed with every scan when the dark photosensors 116 are read through video line 108.

In a typical embodiment of a chip such as 100 with four dark photosensors 110, the selection of four dark photosensors is mandated mainly by standard engineering practice; typically, only one such dark photosensor, such as dark photosensor D3, is used to determine the offset for the subsequent readout of active photosensors. At the beginning of each readout, when it is the turn of dark photosensor D3 to output its dark photosensor signal onto video line 108, a reference voltage, from a source 132 in parallel to the video line 108, is activated, such as through a switch 134. The output of the dark photosensor D3 of dark photosensors 110, simultaneous with the application of reference voltage $V_{REF}$ on the other side of correction capacitor 130, has the effect of placing on correction capacitor 130 a charge, referred to as the "correction charge," representative of both the dark photosensor signal and $V_{REF}$. There may also be other circuits along video line 108, which are here summarized as the influence of an extra unity gain amplifier, indicated as 136.

Figure 3:
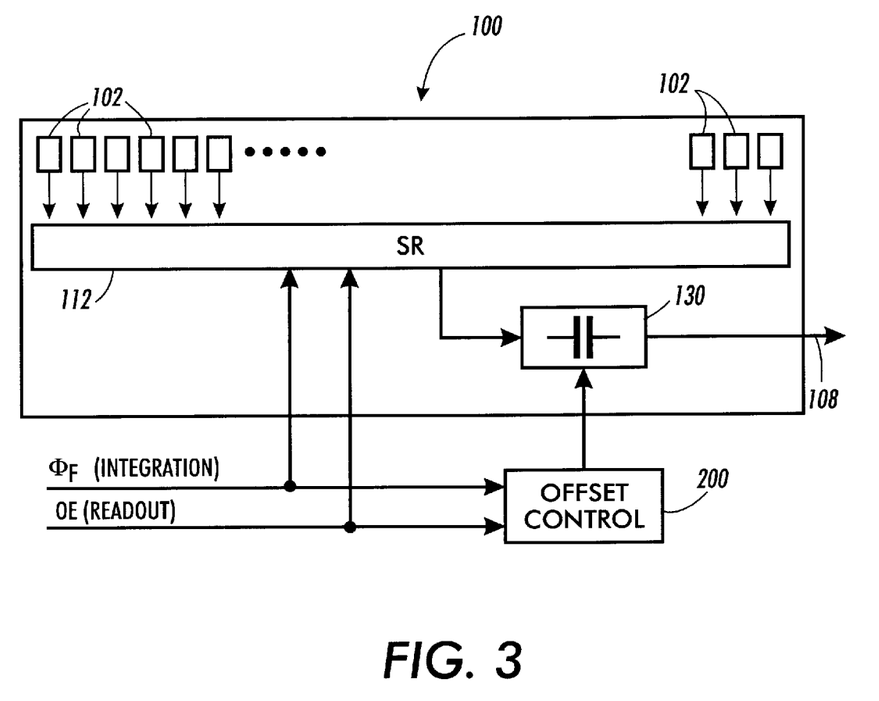
FIG. 3 is a simplified diagram showing a function of the present invention.

FIG. 3 is a simplified systems diagram showing a number of the basic elements of a photosensitive device, such as shown in FIGS. 1 and 2, with particular relevance to the present invention. As mentioned above, there may be reasons, according to a particular scanner design, for temporarily disabling a particular set of photosensors (such as on one chip among a set of chips) within a larger photosensitive device. The details of selectably activating or inactivating different sets of photosensors within a device is not immediately germane to the present invention. However, the fact that particular sets of photosensors are temporarily inactivated in the course of operation of a photosensitive device can affect the integrity of a correction charge placed on a correction capacitor 130 along video line 108. The temporary inactivation of a set of photosensors outputting signals to video line 108 could cause the correction charge on correction capacitor 130 to drift over time, or otherwise become unpredictable, distorting the signals once the set of photosensors resumes placing signals on video line 108. The present invention determines conditions in which a particular video line 108 is temporarily inactivated, and, in response to such a condition, resets the correction charge on correction capacitor 30 once usable video signals are resumed on video line 108.

Speaking in general terms with regard to FIG. 3, there will exist, in many designs of a photosensitive device, means for handling two types of external signals which operate the photosensitive device. One type of signal can be called an "integration signal," and another type of signal can be called a "readout signal." The integration signal causes a set of photosensors 102 in the device to have an integration period, that is, to establish the charge generated on the photosensor over a distinctly-defined time period to be associated with a particular portion of an image. With regard to the terms in the claims below, such an integration signal causes the photosensor to "have" an integration period: an integration signal, which could be a leading or trailing edge of a pulse, could cause an integration period to begin or end, depending on the particular design. The other type of signal used to control a photosensitive device such as 100 is a readout signal. The readout signal is a signal which, when applied to the photosensitive device 100, causes the accumulated charges on a set of photosensors to read out, either in parallel, serial, or a combination of the two, onto one or more video lines. Generally, in a CMOS photosensitive device, the integration signal causes charges on a set of photosensors to transfer to reset nodes (not shown) associated with each photosensor, while the readout signal causes the integrated charges on each reset node to read out onto a video line. However, it will be appreciated that the generally-described principles herein can be applied to other designs of photosensitive devices, in particular charge-coupled devices.

The present invention, in overview, detects situations in which a particular set of photosensors within a photosensitive device are not being used, and then resets a correction capacitor (or some equivalent offset correction device) when video signals resume on the video line. As shown in FIG. 3, the system for carrying out these steps is shown schematically as offset control 200, which may or may not reside on the same chip as the photosensors 102. In overview, the offset control 200 monitors both the integration signals and the readout signals going into a particular device such as chip 100, and detects conditions in which a predetermined number of integration signals are sent to the device 100 without a corresponding readout signal. Depending on the particular design of the photosensitive device 100, this predetermined number of "unanswered" integration signals could be 1, 2, or some large number. The salient point is that if a particular set of photosensors 102 in a device 100 are being caused to have a particular number of integration periods without a readout of the video signals, the offset correction device (such as including correction capacitor 130) may have a "wrong" correction charge on it once the video signals resume.

According to one aspect of the present invention, offset control 200 detects a predetermined number of integration signals received by the photosensitive device 100 without a readout signal, and in response to detecting such a condition, causes the offset correction device to "reset" on offset on the video line. In general, this reset can include any reestablishing of even a temporary control over the offset on the video line, such as by associating an offset of a known magnitude with the video line by any technique suitable for a particular design of the photosensitive device. If the offset correction device includes a correction capacitor such as 130, offset correction device 200 can accomplish this reset by placing a charge of predetermined known magnitude on correction capacitor 130. This resetting of the offset occurs in response to the photosensitive device 100 receiving a readout signal following a series of "unanswered" integration signals.

The following discussion is directed toward a particular embodiment of the system generally described in FIG. 3, with particular regard to the photosensor design such as shown in FIGS. 1 and 2.

Figure 4:
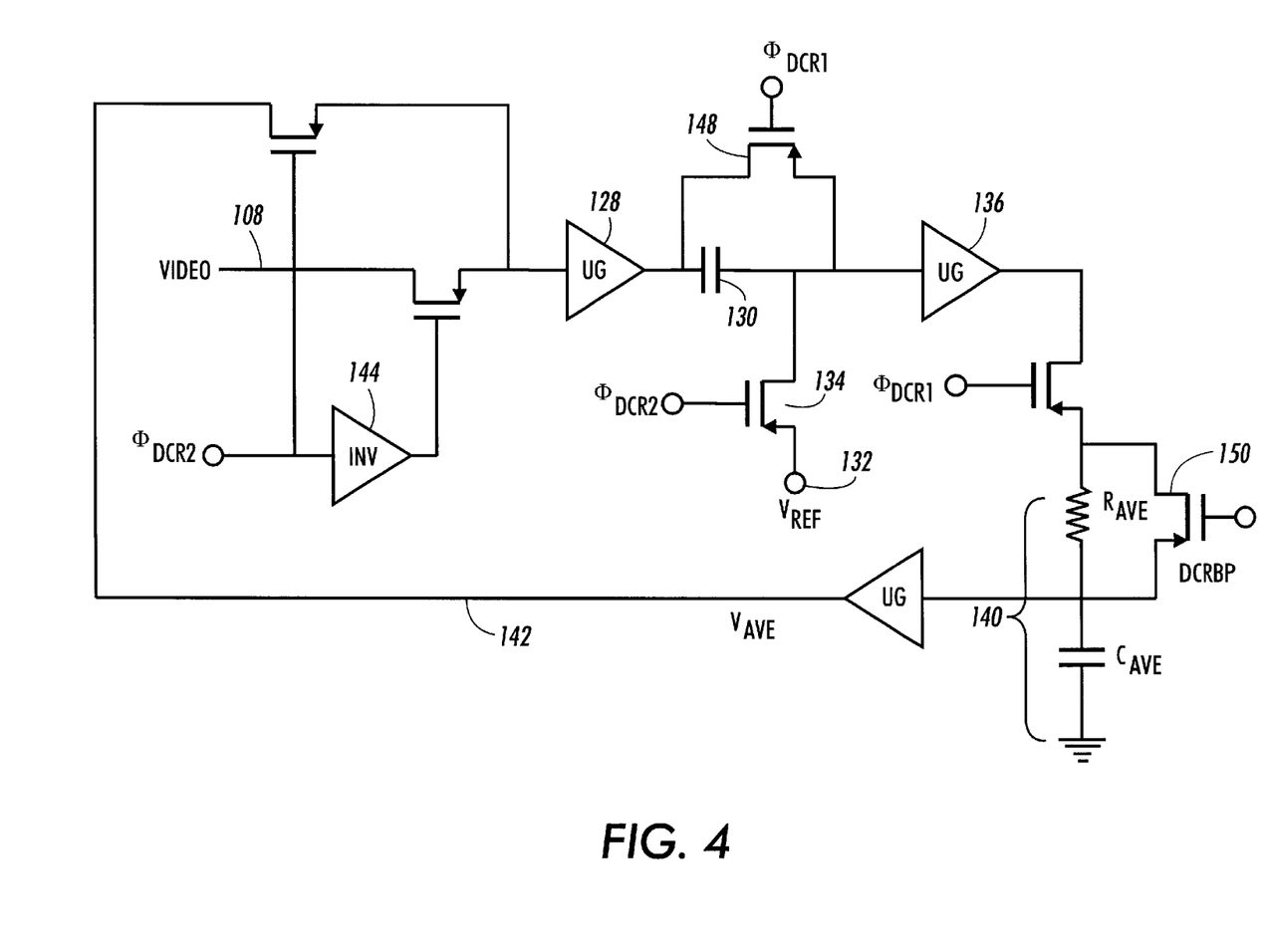
FIG. 4 is a schematic diagram of a circuit, according to a preferred embodiment of the present invention, showing a circuit for determining an offset for a video line from dark photosensor signals.

FIG. 4 is a schematic diagram of a simple embodiment of a dark photosensor offset circuit which can be reset with a predetermined offset; it is similar to the circuit disclosed in the co-pending application cross-referenced above. It will be noted that the circuit of FIG. 4 shares key similarities with the simple circuit of FIG. 2: the circuit of FIG. 4 is disposed at the end of the video line 108, so as to receive signals from both the dark photosensors 110 and the active photosensors 102. There is also a unity gain amplifier 128, and correction capacitor 130 on the video line. As in the FIG. 2 circuit, a reference voltage $V_{REF}$ is available to the video line 108 through transistor 134.

A significant feature of the circuit of FIG. 4 is an RC circuit, indicated as 140, in parallel with the video line 108. This RC, in turn, is connected through an average voltage line 142 (which may include a unity-gain amplifier as shown), to selectably apply an average voltage $V_{AVE}$ to the video line 108 when activated by switching means 144. There is also provided in the circuit of FIG. 4 a bypass switch 148, which, as shown, causes correction capacitor 130 to be bypassed on video line 108 when a voltage is applied thereto.

The RC circuit 140 functions as an averaging circuit which samples the video from both the dark photosensor D2 and dark photosensor D3 with every scan on video line 108. The values of R and C of the RC circuit 140 should be set so that samples of the video signals from dark photosensor D2 and dark photosensor D3 over a relatively large number of scans are accumulated. In other words, R and C provide a time constant by which the effect of numerous scans of dark photosensors D2 and D3 loaded onto the RC circuit 140 cause the RC circuit 140 to maintain a running average of the outputs of dark photosensors D2 and D3 over a large number of scanlines. For example, if it is desired to maintain a running average of 100 scanlines, then the value of RC should be set equal to 100 times the duration of the sample clock with each scan. Generally, the RC should be chosen to sample at least 10 scanlines, and preferably about 100 scanlines, in order to obtain its average dark photosensor signal.

In addition to the basic elements of FIG. 4 which have been described above, there is a "bypass transistor," or bypass switch, indicated as 150. As can be seen in FIG. 4, bypass switch 150 is a transistor which, when activated, bypasses the resistance $R_{AVE}$ forming part of the averaging circuit 140. When bypass transistor 150 is thus activated, it will be seen that voltage from the video line 108, such as, (but not necessarily) a signal derived from a dark photosensor, will be loaded relatively quickly onto the capacitor $C_{AVE}$ of averaging circuit 140. If the activated transistor 150 were a perfect transistor with no resistance, conceivably a full amount of the dark-photosensor charge could be loaded onto capacitor $C_{AVE}$ very quickly, but, as the activated transistor 150 will have some resistance associated therewith, a number of cycles of photosensor readouts are typically required to "load" the capacitor $C_{AVE}$ with a potential which is generally in the range of the dark offset values from the dark photosensors.

The detailed operation of the circuitry shown in FIG. 4 can be found in the patent incorporated by reference. According to this embodiment of the present invention, there is provided an input for $\phi_{DCRBP}$, or "DC restore bypass signal," which is used to control bypass switch 150. An application of $\phi_{DCRBP}$ on bypass transistor 150 is used to bypass the correction capacitor 130 and load signals onto averaging circuit 140 so that the resistor $R_{AVE}$ in averaging circuit 140 is bypassed in favor of the significantly lower resistance on transistor 150. This has the effect of loading a predetermined potential onto $C_{AVE}$ at a significantly faster rate than would be the case if the signals had to pass through $R_{AVE}$. In short, use of the bypass transistor 150 provides a "jump start" to loading potential onto the $C_{AVE}$ of averaging circuit 140, so that averaging circuit 140 can more quickly output usable signals in the context of the circuit of FIG. 4. In this embodiment of the invention, the predetermined charge loaded onto $C_{AVE}$ and thus onto correction capacitor 130 is related to an average offset derived from the signals from the dark photosensors, but it is possible to bias correction capacitor 130 to a fixed potential which is known to be close to a typical offset value, or which is derived by some other technique.

Relating the general principle of the present invention, as described in FIG. 3, to an embodiment of the invention corresponding to FIGS. and 1 and 4, the essential inputs for an offset control device 200 such as shown in FIG. 3 are the $\phi_F$ or fence clock, being the integration signal, and an output enable or OE signal, acting as the readout signal. To correspond to the embodiment of FIG. 4, the necessary output of offset control 200 is a pulse $\phi_{DCRBP}$ which is applied to bypass transistor 150. As described above, such an application of $\phi_{DCRBP}$ to bypass transistor 150 in the circuit of FIG. 4 will cause a correction charge of suitable magnitude to be placed on correction capacitor 130 and thus influence subsequent video signals on video line 108.

With further regard to the present embodiment of the invention, it can be seen that application of the $\phi_{DCRBP}$ pulse, in combination with the application of $\phi_{DCR1}$ and $\phi_{DCR2}$ pulses such as described in the patent incorporated by reference, has the effect of transferring the voltage on $C_{AVE}$ to correction capacitor 130. The voltage on $C_{AVE}$ is related to an average of readings from the dark photosensors D1–D4 as described above with regard to FIG. 1. In this way, the reset charge placed on correction capacitor 130 is related to a running average of outputs from the dark photosensors, representing an average offset for all photosensors on the chip 100. In alternate embodiments, there could be, for instance, a special set-aside dark photosensor or set of photosensors, having the sole function of determining an offset for resetting an offset correction device as required.

Figure 5:
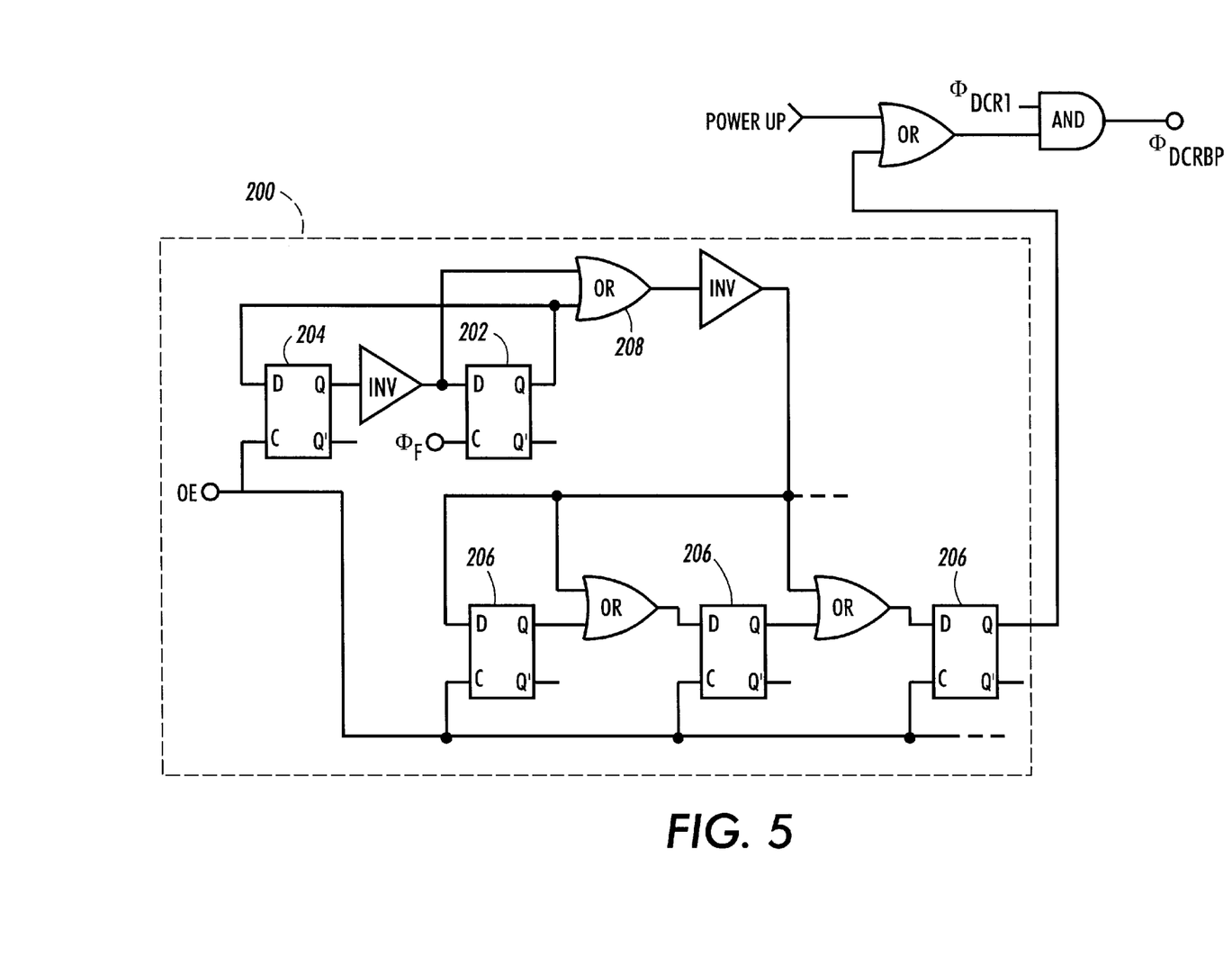
FIGS. 5 and 6 illustrate separate possible embodiments of circuits in accordance with the present invention.
Figure 6:
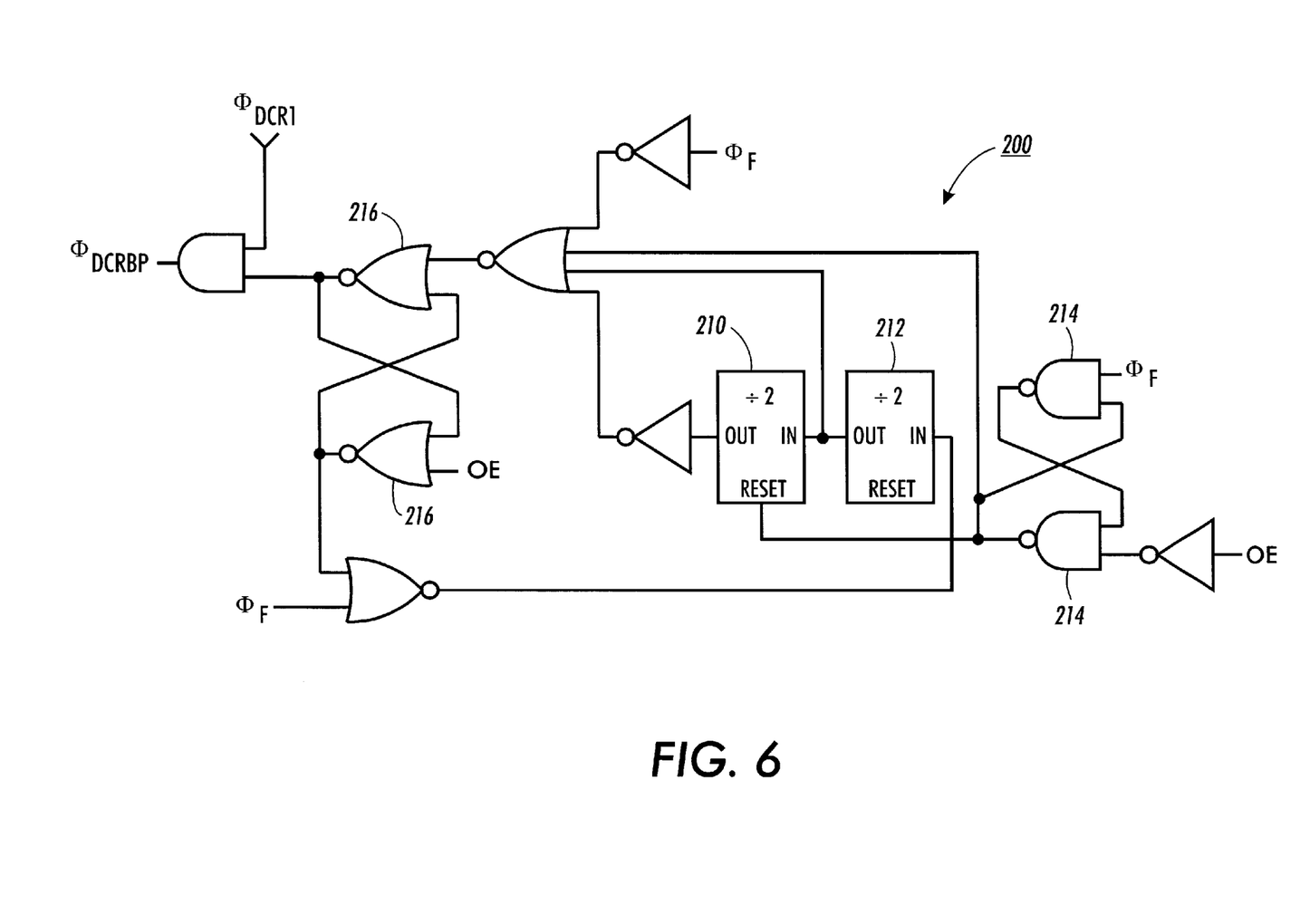

FIGS. 5 and 6 are schematic diagrams showing, respectively, two different embodiments for the offset control 200 such as used in FIG. 3. In either case, as can be seen, the relative inputs are $\phi_F$ and output enable OE. The overall function of each offset control device 200 is to monitor a situation in which a number of $\phi_F$ or "integration" pulses are received without a corresponding output enable OE "readout" pulse. When such a condition is detected, the offset control device 200 outputs a $\phi_{DCRBP}$ pulse (or a series of such pulses), which has the effect of placing a predetermined potential on correction capacitor 130, or, in more general terms, resetting the offset correction device. Once again, the actual number of "unanswered" $\phi_F$ or integration pulses required before outputting $\phi_{DCRBP}$ is a matter of design choice depending on the particular design of the photosensitive apparatus 100.

With regard to the FIG. 5 embodiment, there is provided a chain of data latches 202, 204 and 206. The ultimate output of this chain is ultimately sent to $\phi_{DCRBP}$. Of the data latches in the chain, latch 202 is connected to the $\phi_F$ integration pulse. The configuration shown in FIG. 5 shows a situation in which the $\phi_{DCRBP}$ will be emitted when there is only one "unanswered" $\phi_F$ integration pulse, but it is possible to provide a configuration which will wait for two or more unanswered $\phi_F$ pulses simply by chaining together a number of latches 202 with the output thereof fed into XOR gate 208. The latch 204 preceding latch 202 takes as an input the "readout" pulse OE. Finally, at the other side of XOR gate 208 is a series of latches 206, the number of latches 206 as configured determining the number of $\phi_{DCRBP}$ desired to be placed on bypass transistor 150 for a particular implementation, such as to bring the capacitor $C_{AVE}$ to a suitable bias in the circuit of FIG. 4.

Also shown in FIG. 5 is the output of offset correction device 200 ORed with a similar device which responds to a power-up signal for the whole device (such device can be seen in the co-pending patent application referenced above); and also, the output of offset control 200 can be coupled with the $\phi_{DCR1}$ signal, the specific function of which can be found in the patent incorporated by reference, so that the output of the circuit of FIG. 5 can conform to the input of the circuit of FIG. 4.

With reference to FIG. 6, once again, the relevant inputs are $\phi_F$ as an integration signal and OE as a readout signal, with the ultimate output of $\phi_{DCRBP}$. In the FIG. 6 embodiment, the various inputs are fed, as in the configuration shown, to a circuit including, in particular, two "divide by two" devices 210 and 212. In brief, inputs to the resets of dividers 210 and 212 sets the output of the devices to zero, while a rising input to the devices toggles the output of the devices. The two-stage divider and accompanying logic check for an OE missing for every two $\phi_F$ pulses. The flip-flop formed by gates 214 resets the dividers 210 and 212 every time OE is pulsed, while the flip-flop formed by gates 216 holds the output thereof low during missing OE pulses and then holds it high after the first OE comes back.

Although in the preferred embodiment of the present invention, there is provided on a single chip a set of dark photosensors sharing a video line with a set of active photosensors, the essential principle of the present invention need not be restricted to this particular embodiment. There is known in the prior art alternate designs of a photosensitive chip, such as including a design in which the active photosensor signals are averaged for calibration purposes. Also, the function of the claimed invention can in large part be embodied in a computer device, such as a microprocessor, sensitive to and operative of various nodes in a photosensitive device. The present invention may be useful in any situation in which digital outputs, whether from dark or active photosensors, are averaged together on an averaging circuit for whatever purpose.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A photosensitive device, comprising:
   a set of photosensors;
   a video line;
   integration means for causing the photosensors in the set of photosensors to have an integration period in response to an integration signal;
   readout means for causing the photosensors in the set of photosensors to read out video signals onto the video line in response to a readout signal;
   detecting means for detecting a condition in which a predetermined number of integration signals are received by the device without receiving a readout signal; and
   an offset control for resetting an offset on the video line when the device receives a predetermined number of integration signals without receiving a readout signal.

2. The device of claim 1, the offset control resetting the offset on the video line by associating an offset of predetermined magnitude with the video line.

3. The device of claim 2, including at least one dark photosensor, and wherein the offset of predetermined magnitude is related to an output from the dark photosensor.

4. The device of claim 1, further comprising a correction capacitor associated with the video line, the correction capacitor adapted to retain a correction charge thereon to influence the voltage signals from the photosensors, and the offset control causing an offset of predetermined magnitude to be placed on the correction capacitor.

5. The photosensitive device of claim 1, the detecting means including a number of data latches relating to the predetermined number of integration signals received by the device without receiving a readout signal.

6. The photosensitive device of claim 1, further comprising means for resetting the offset substantially immediately before readout signals are resumed.

7. A method of operating a photosensitive device, the device comprising a set of photosensors and a video line, the photosensors having an integration period in response to an integration signal and reading out video signals onto the video line in response to a readout signal, comprising the steps of:

detecting a condition in which a predetermined number of integration signals are received by the device without receiving a readout signal; and resetting an offset on the video line when the device receives a predetermined number of integration signals without receiving a readout signal.

8. The method of claim 7, the resetting step including associating an offset of predetermined magnitude with the video line.

9. The method of claim 8, wherein the device includes at least one dark photosensor, and wherein the offset of predetermined magnitude is related to at least one output from the dark photosensor.

10. The method of claim 7, wherein the device includes a correction capacitor associated with the video line, the correction capacitor adapted to retain a correction charge thereon to influence the voltage signals from the active photosensors, and the resetting step including placing an offset of predetermined magnitude on the correction capacitor.

11. The method of claim 7, further comprising inactivating at least one of the set of photosensors so that the photosensor does not receive a readout signal.

12. The method of claim 7, further comprising resetting the offset substantially immediately before readout signals are resumed.

* * * * *